Dec. 9, 1947.  P. E. CREIGHTON  2,432,387
LENSES FOR CINEMATOGRAPHY
Filed Feb. 9, 1946

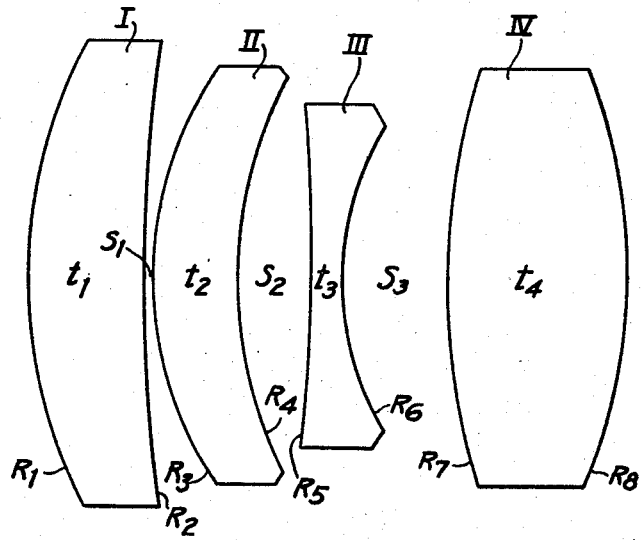

FIG. 1.

FIG. 2.

| EF = 100 mm. | | | | f/1.9 |
|---|---|---|---|---|
| LENS | $N_D$ | V | RADII | THICKNESSES |
| I | 1.611 | 58.8 | $R_1 = + 71.8$ | $t_1 = 12.3$ |
| | | | $R_2 = +655.5$ | $S_1 = 0.7$ |
| II | 1.611 | 58.8 | $R_3 = + 46.7$ | $t_2 = 10.6$ |
| | | | $R_4 = + 61.8$ | $S_2 = 12.9$ |
| III | 1.720 | 29.3 | $R_5 = -201.0$ | $t_3 = 3.7$ |
| | | | $R_6 = + 35.4$ | $S_3 = 13.2$ |
| IV | 1.734 | 51.1 | $R_7 = + 83.3$ | $t_4 = 23.2$ |
| | | | $R_8 = - 63.9$ | BF= 63.0 |

FIG. 3.

| EF = 100 mm. | | | | f/1.9 |
|---|---|---|---|---|
| LENS | $N_D$ | V | RADII | THICKNESSES |
| I | 1.611 | 58.8 | $R_1 = + 60.4$ | $t_1 = 12.3$ |
| | | | $R_2 = +482.5$ | $S_1 = 0.7$ |
| II | 1.611 | 58.8 | $R_3 = + 45.5$ | $t_2 = 10.6$ |
| | | | $R_4 = + 52.8$ | $S_2 = 9.3$ |
| III | 1.720 | 29.3 | $R_5 = -193.5$ | $t_3 = 3.7$ |
| | | | $R_6 = + 35.6$ | $S_3 = 13.2$ |
| IV | 1.734 | 51.1 | $R_7 = + 82.3$ | $t_4 = 23.2$ |
| | | | $R_8 = - 67.3$ | BF= 64.2 |

FIG. 4.

| EF = 100 mm. | | | | f/1.9 |
|---|---|---|---|---|
| LENS | $N_D$ | V | RADII | THICKNESSES |
| I | 1.588 | 53.4 | $R_1 = + 61.0$ | $t_1 = 12.3$ |
| | | | $R_2 = +576.0$ | $S_1 = 0.7$ |
| II | 1.611 | 57.2 | $R_3 = + 48.2$ | $t_2 = 10.6$ |
| | | | $R_4 = + 63.5$ | $S_2 = 9.3$ |
| III | 1.720 | 29.3 | $R_5 = -193.0$ | $t_3 = 3.7$ |
| | | | $R_6 = + 35.7$ | $S_3 = 13.2$ |
| IV | 1.697 | 56.1 | $R_7 = + 84.5$ | $t_4 = 23.2$ |
| | | | $R_8 = - 63.0$ | BF= 63.9 |

PHILIP E. CREIGHTON
INVENTOR
BY Newton M. Perrins
F M Emerson Holmes
ATTY & AG'T Patented Dec. 9, 1947

2,432,387

UNITED STATES PATENT OFFICE 2,432,387

LENSES FOR CINEMATOGRAPHY

Philip E. Creighton, Rochester, N. Y., assignor to Eastman Kodak Company, Rochester, N. Y., a corporation of New Jersey Application February 9, 1946, Serial No. 646,688

4 Claims. (Cl. 88—57)

This invention relates to photographic objectives.

The object of the invention is to provide a very rapid objective particularly suitable for cinematography, which is economical to manufacture and which has better all-around correction of the lens aberrations over a moderate angular field than objectives of similar complexity and cost heretofore available.

A known type of objective which has been found suitable for cinematography consists of four components, of which at least three are simple elements and which are as follows, counting from the front to the rear of the objective: (1) a meniscus positive component convex to the front, (2) a second meniscus component, positive or weakly negative in power and convex to the front, (3) a biconcave component having its more strongly curved surface to the rear, and (4) a biconvex component. Although many forms of such lenses have been designed and published, they have never been used extensively, mainly because competing types were slightly superior. I have found, on the other hand, that a certain specific novel form of this lens is definitely superior to the others, and even to competing types of lenses.

According to the present invention, a lens of this type with superior correction of the aberrations is made up, having each refractive index N, each radius of curvature R of the bounding surfaces of the components, each thickness T and separation S of the components within the range specified in the following table, each group of quantities being numbered by subscripts from front to rear:

| Lens characteristic | Preferred range |
|---|---|
| $N_1$ | From 1.57 to 1.75. |
| $N_2$ | From 1.57 to 1.75. |
| $N_3$ | From 1.65 to 1.85. |
| $N_4$ | From 1.64 to 1.80. |
| $R_1$ | From .55F to .75F. |
| $R_2$ | From 2F to 50F. |
| $R_3$ | From .38F to .50F. |
| $R_4$ | From .50F to .80F. |
| $R_5$ | From 1.4F to 4F. |
| $R_6$ | From .32F to .42F. |
| $R_7$ | From .75F to F. |
| $R_8$ | From .5F to 1.2F. |
| $T_1$ | From .09F to .18F. |
| $T_2$ | From .09F to .18F. |
| $T_3$ | From .02F to .10F. |
| $T_4$ | From .10F to .25F. |
| $S_1$ | From .001F to .04F. |
| $S_2$ | From .06F to .15F. |
| $S_3$ | From .10F to .18F. | where F is the focal length of the objective.

It is preferred also that in absolute values the sum $$\frac{F}{R_7} + \frac{F}{R_8}$$

should be between 2.7 and 2.8. This sum is roughly proportional to the power of the rear component.

In the accompanying drawing:

Fig. 1 shows an objective according to the invention.

Figs. 2, 3, and 4, give data for preferred embodiments corresponding to Fig. 1.

These data are as follows, the focal length being 100 mm. in each case:

Example I, Fig. 2

| Indices | Dispersions | Radii | Thicknesses |
|---|---|---|---|
| $N_1=1.611$ | $V_1=58.8$ | $R_1=+71.8$ mm. | $T_1=12.3$ mm. |
|  |  | $R_2=+655.5$ | $S_1=0.7$ |
| $N_2=1.611$ | $V_2=58.8$ | $R_3=+46.7$ | $T_2=10.6$ |
|  |  | $R_4=+61.8$ | $S_2=12.9$ |
| $N_3=1.720$ | $V_3=29.3$ | $R_5=-201.0$ | $T_3=3.7$ |
|  |  | $R_6=+35.4$ | $S_3=13.2$ |
| $N_4=1.734$ | $V_4=51.1$ | $R_7=+83.3$ | $T_4=23.2$ |
|  |  | $R_8=-63.9$ | $BF=63.0$ |

Example II, Fig. 3

| Indices | Dispersions | Radii | Thicknesses |
|---|---|---|---|
| $N_1=1.611$ | $V_1=58.8$ | $R_1=+60.4$ mm. | $T_1=12.3$ mm. |
|  |  | $R_2=+482.5$ | $S_1=0.7$ |
| $N_2=1.611$ | $V_2=58.8$ | $R_3=+45.5$ | $T_2=10.6$ |
|  |  | $R_4=+52.8$ | $S_2=9.3$ |
| $N_3=1.720$ | $V_3=29.3$ | $R_5=-193.5$ | $T_3=3.7$ |
|  |  | $R_6=+35.6$ | $S_3=13.2$ |
| $N_4=1.734$ | $V_4=51.1$ | $R_7=+82.3$ | $T_4=23.2$ |
|  |  | $R_8=-67.3$ | $BF=64.2$ |

Example III, Fig. 4

| Indices | Dispersions | Radii | Thicknesses |
|---|---|---|---|
| $N_1=1.588$ | $V_1=53.4$ | $R_1=+61.0$ mm. | $T_1=12.3$ mm. |
|  |  | $R_2=+576$ | $S_1=0.7$ |
| $N_2=1.611$ | $V_2=57.2$ | $R_3=+48.2$ | $T_2=10.6$ |
|  |  | $R_4=+63.5$ | $S_2=9.3$ |
| $N_3=1.720$ | $V_3=29.3$ | $R_5=-193$ | $T_3=3.7$ |
|  |  | $R_6=+35.7$ | $S_3=13.2$ |
| $N_4=1.697$ | $V_4=56.1$ | $R_7=+84.5$ | $T_4=23.2$ |
|  |  | $R_8=-63.0$ | $BF=63.9$ |

In these tables the index N is given for the D line of the spectrum, $V_1$ to $V_4$ are the dispersive indices corresponding to the refractive indices $N_1$ to $N_4$, and BF is the back focal length of the objective. The plus (+) and minus (−) signs indicate surfaces respectively convex and concave to the front. The remaining symbols are as previously defined.

These objectives are highly corrected for use at apertures up to F/1.9 and for covering fields up to ± 12° or ± 15°. It is readily seen that each example embodies all the features of the invention, the numerical sum $$\frac{F}{R_7}+\frac{F}{R_8}$$

being about 2.8 in each case specifically 2.76, 2.70 and 2.77 in the three examples respectively, all of which are between 2.7 and 2.8.

Although all four components are shown as simple elements, one of the components may be made up as a cemented doublet without departing from the spirit of the invention, in which case the index N to be considered is that of the strongest element having the same sign as the whole component.

I claim:

1. A photographic objective consisting of two meniscus components convex to the front, a biconcave component, and a biconvex component in that order, at least three of the four components being simple elements, the refractive index N of the strongest element in each component which has the same sign as the whole component, the radii R of the front and rear surfaces of each component, the thicknesses T, and the separations S of the components numbered in order in each case from front to rear being within the range specified in the following table:

| Lens characteristic | Range |
| --- | --- |
| $N_1$ | From 1.57 to 1.75. |
| $N_2$ | From 1.57 to 1.75. |
| $N_3$ | From 1.65 to 1.85. |
| $N_4$ | From 1.64 to 1.80. |
| $R_1$ | From .55F to .75F. |
| $R_2$ | From 2F to 50F. |
| $R_3$ | From .38F to .50F. |
| $R_4$ | From .50F to .80F. |
| $R_5$ | From 1.4F to 4F. |
| $R_6$ | From .32F to .42F. |
| $R_7$ | From .75F to F. |
| $R_8$ | From .5F to 1.2F. |
| $T_1$ | From .09F to .18F. |
| $T_2$ | From .09F to .18F. |
| $T_3$ | From .02F to .10F. |
| $T_4$ | From .10F to .25F. |
| $S_1$ | From 0.001F to .04F. |
| $S_2$ | From .06F to .15F. |
| $S_3$ | From .10F to .18F. | where F is the focal length of the objective.

2. An objective as claimed in claim 1, in which the sum $$\frac{F}{R_7}+\frac{F}{R_8}$$

in absolute values is between 2.7 and 2.8.

3. An objective substantially according to the following specifications:

| Indices | Dispersions | Radii | Thicknesses |
| --- | --- | --- | --- |
| $N_1=1.61$ | $V_1=59$ | $R_1=+.60F$ | $T_1=.12F$ |
| | | $R_2=+4.8F$ | $S_1=.01F$ |
| $N_2=1.61$ | $V_2=59$ | $R_3=+.46F$ | $T_2=.11F$ |
| | | $R_4=+.53F$ | $S_2=.09F$ |
| $N_3=1.72$ | $V_3=29$ | $R_5=-1.9F$ | $T_3=.04F$ |
| | | $R_6=+.36F$ | $S_3=.13F$ |
| $N_4=1.73$ | $V_4=51$ | $R_7=+.82F$ | $T_4=.23F$ |
| | | $R_8=-.67F$ | | in which the refractive indices N, the dispersive indices V, the radii of curvature R, of the surfaces, the thicknesses T of the components, and the spaces S between the components, are in each case numbered in order from front to rear, the refractive indices are given for the D line of the spectrum, the + and − values of radii denote surfaces respectively convex and concave to the front, and in which F is the focal length of the objective.

4. An objective substantially according to the following specifications:

| Indices | Dispersions | Radii | Thicknesses |
| --- | --- | --- | --- |
| $N_1=1.59$ | $V_1=53$ | $R_1=+.61F$ | $T_1=.12F$ |
| | | $R_2=+5.8F$ | $S_1=.01F$ |
| $N_2=1.61$ | $V_2=57$ | $R_3=+.48F$ | $T_2=.12F$ |
| | | $R_4=+.64F$ | $S_2=.09F$ |
| $N_3=1.72$ | $V_3=29$ | $R_5=-1.9F$ | $T_3=.04F$ |
| | | $R_6=+3.6F$ | $S_3=.13F$ |
| $N_4=1.70$ | $V_4=56$ | $R_7=+.84F$ | $T_4=.23F$ |
| | | $R_8=-.63F$ | | in which the refractive indices N, the dispersive indices V, the radii of curvature R of the surfaces, the thicknesses T of the components, and the spaces S between the components are in each case numbered in order from front to rear, the refractive indices are given for the D line of the spectrum, the + and − values of radii denote surfaces respectively convex and concave to the front, and in which F is the focal length of the objective.

PHILIP E. CREIGHTON.

REFERENCES CITED

The following references are of record in the file of this patent:

UNITED STATES PATENTS

| Number | Name | Date |
| --- | --- | --- |
| 2,170,428 | Richter | Aug. 22, 1939 |
| 2,343,629 | Altman | Mar. 7, 1944 |
| 2,270,235 | Warmisham | Jan. 20, 1942 |

FOREIGN PATENTS

| Number | Country | Date |
| --- | --- | --- |
| 803,679 | France | July 15, 1936 |